US010435923B2

(12) United States Patent
Cheng

(10) Patent No.: US 10,435,923 B2
(45) Date of Patent: Oct. 8, 2019

(54) SWING TYPE POWER DOOR LOCK ACTUATOR

(71) Applicant: TAIGER INTERNATIONAL CORP., New Taipei (TW)

(72) Inventor: Li Cheng, New Taipei (TW)

(73) Assignee: Taiger International Corp., New Taipei (TW)

(*) Notice: Subject to any disclaimer, the term of this patent is extended or adjusted under 35 U.S.C. 154(b) by 465 days.

(21) Appl. No.: 15/347,321

(22) Filed: Nov. 9, 2016

(65) Prior Publication Data
US 2017/0058574 A1 Mar. 2, 2017

Related U.S. Application Data

(63) Continuation-in-part of application No. 14/082,015, filed on Nov. 15, 2013, now abandoned.

(51) Int. Cl.
E05B 81/36 (2014.01)
E05B 81/06 (2014.01)
E05B 81/24 (2014.01)
E05B 81/30 (2014.01)
E05B 81/40 (2014.01)
F16H 19/04 (2006.01)
F16H 37/12 (2006.01)
F16H 25/20 (2006.01)

(52) U.S. Cl.
CPC ............ E05B 81/25 (2013.01); E05B 81/06 (2013.01); E05B 81/30 (2013.01); E05B 81/36 (2013.01); E05B 81/40 (2013.01); F16H 19/04 (2013.01); F16H 37/122 (2013.01); F16H 2025/204 (2013.01); F16H 2025/2081 (2013.01); Y10T 74/18576 (2015.01)

(58) Field of Classification Search
USPC ................................ 292/199, 201, 279, 280
See application file for complete search history.

(56) References Cited

U.S. PATENT DOCUMENTS

| 1,208,556 A | 12/1916 | Helmholtz |
| 1,317,092 A | 9/1919 | Maurer |
| 1,859,909 A | 5/1932 | Bertram |
| 1,981,591 A | 11/1934 | Edmondson |
| 2,159,225 A | 5/1939 | Kull |
| 3,116,931 A | 1/1964 | Edwards |
| 3,310,990 A | 3/1967 | Zettel |
| 3,810,395 A | 5/1974 | Takahashi |
| 4,011,764 A | 3/1977 | Buck |
| 4,135,377 A | 1/1979 | Kleefeldt |
| 4,257,634 A | 3/1981 | Kleefeldt |
| 4,270,783 A | 6/1981 | Sorensen |
| 4,364,249 A | 12/1982 | Kleefeldt |

(Continued)

Primary Examiner — Carlos Lugo
(74) Attorney, Agent, or Firm — Muncy, Geissler, Olds & Lowe, P.C.

(57) ABSTRACT

A swing type power door lock actuator includes a housing having mounted therein a drive unit, which includes a motor, a transmission unit, which includes a screw shaft connected to the motor and a transmission seat threaded onto the screw shaft, and a swing unit, which includes a sector gear meshed with the transmission seat and a swing arm connected to the sector gear. When the motor is started, the screw shaft is driven to move the transmission seat, causing the sector gear to bias the swing arm between a locking position and an unlocking position.

11 Claims, 10 Drawing Sheets

(56) References Cited

U.S. PATENT DOCUMENTS

| | | | | |
|---|---|---|---|---|
| 4,573,723 A | * | 3/1986 | Morita | E05B 81/25 185/40 R |
| 4,601,500 A | | 7/1986 | Bernard | |
| 4,624,491 A | | 11/1986 | Vincent | |
| 4,669,283 A | * | 6/1987 | Ingenhoven | E05B 81/25 292/144 |
| 4,674,781 A | * | 6/1987 | Reece | E05B 81/25 292/201 |
| 4,708,378 A | * | 11/1987 | Ingenhoven | E05B 81/25 292/201 |
| 4,723,454 A | | 2/1988 | Periou | |
| 4,735,447 A | | 4/1988 | Kleefeldt | |
| 4,825,714 A | | 5/1989 | Yamanaka | |
| 4,941,694 A | * | 7/1990 | Bartel | E05B 81/25 292/201 |
| 4,948,183 A | | 8/1990 | Yamada | |
| 5,028,083 A | | 7/1991 | Mischenko | |
| 5,037,145 A | * | 8/1991 | Wilkes | E05B 81/25 292/201 |
| 5,079,964 A | | 1/1992 | Hamada | |
| 5,137,312 A | * | 8/1992 | Tang | E05B 81/25 292/201 |
| 5,441,315 A | | 8/1995 | Kleefeldt et al. | |
| 5,472,065 A | * | 12/1995 | Vergin | E05B 81/25 185/40 R |
| 5,628,535 A | | 5/1997 | Buscher | |
| 5,671,958 A | | 9/1997 | Szapucki | |
| 5,762,384 A | | 6/1998 | Bartel | |
| 5,983,739 A | | 11/1999 | Feder | |
| 6,079,237 A | | 6/2000 | Hochart | |
| 6,119,538 A | * | 9/2000 | Chang | E05B 81/25 292/144 |
| 6,308,587 B1 | | 10/2001 | Shinkawa | |
| 6,739,633 B2 | * | 5/2004 | Holloway | E05B 83/34 292/144 |
| 6,748,816 B2 | | 6/2004 | Rogers, Jr. | |
| 7,044,509 B2 | | 5/2006 | Radel | |
| 7,188,871 B2 | | 3/2007 | Nemoto | |
| 7,441,813 B2 | | 10/2008 | Qin | |
| 8,322,760 B2 | | 12/2012 | Wu | |
| 2008/0073917 A1 | | 3/2008 | Ciavaglia | |
| 2015/0035300 A1 | | 2/2015 | Taylor | |

* cited by examiner

SWING TYPE POWER DOOR LOCK ACTUATOR

CROSS REFERENCE TO RELATED APPLICATIONS

This application is a Continuation-in-Part of co-pending application Ser. No. 14/082,015, filed on 15 Nov. 2013, for which priority is claimed under 35 U.S.C. § 120 and the entire contents of all of which are hereby incorporated by reference.

BACKGROUND OF THE INVENTION

1. Field of the Invention

The present invention relates to a central car door locking system, and more particularly, to a swing type power door lock actuator.

2. Description of the Related Art

Currently, all cars are equipped with a central door locking system for controlling the locking and unlocking of all the car doors to enhance driver and passenger safety and convenience. Conventional central control car door lock systems (or power door lock actuators) are generally divided into the push-pull type and the swing type. A push-pull type actuator uses an actuating bar (or rod) to push and pull mechanical car door locks between the locking position and the unlocking position. A swing type actuator uses a single swing arm to swing, thereby driving mechanical car door locks between the locking position and the unlocking position. For the advantages of high actuating force, low failure rate and small size for easy installation, swing type actuator has gradually become the standard equipment of major car manufacturing companies.

U.S. Pat. No. 5,441,315 discloses an electric-motor drive for motor-vehicle central lock system, which uses a reversible electric motor to drive an input gear, thereby biasing a support of biasing means. When the support of the biasing means is being biased, a coupling gear is forced into engagement with an output gear, driving the output gear to rotate a threaded output spindle, and thus a nut is forced to move along the threaded output spindle. During movement of the nut along the threaded output spindle, an actuating element is forced by the nut to move a latch between two positions, thereby locking or unlocking the mechanical car door locks. According to this design, when the motor is started up, the rotary driving force must be transmitted through the biasing means for rotating the threaded spindle. The arrangement of the biasing means complicates the structure. Further, any minor installation error of the biasing means can affect the transmission performance. Further, transmission between the nut and the swing arm is achieved by means of matching between a circular block and a U-shaped groove. This arrangement can cause operation inaccuracy of the swing arm due to a manufacturing or installation error. In other words, this prior art patent has the drawbacks of complicated structure, installation difficulty and high failure rate.

SUMMARY OF THE INVENTION

The present invention has been accomplished under the circumstances in view. It is the main object of the present invention to provide a swing type power door lock actuator, which has the characteristics of simple structure, precision trans of gearing, smooth actuation and small size for easy installation.

To achieve this and other objects of the present invention, a swing type power door lock actuator of the invention includes a housing, a drive unit, a transmission unit and a swing unit. The housing comprises two opposing inner slide rails. The drive unit is mounted inside the housing, comprising a motor having a motor shaft. The transmission unit is mounted inside the housing, comprising a screw shaft and a transmission seat. The screw shaft has one end thereof coupled to the motor. The transmission seat is slidably set between the two inner slide rails and threaded onto the screw shaft, comprising a toothed rack. The swing unit comprises a sector gear and at least one swing arm. The sector gear is pivotally mounted in the housing. The sector gear comprises a tooth-bearing face meshed with the toothed rack of the transmission unit. The at least one swing arm is disposed outside the housing, each having one end thereof connected to the sector gear.

In one embodiment of the present invention, a micro switch is mounted inside the housing and electrically connected to the motor through a control module. When a trigger push block of the transmission seat pushes a trigger lever of the micro switch, the control module controls the motor to stop rotating.

In one embodiment of the present invention, the transmission seat comprises two outer rails respectively disposed at two opposite lateral sides thereof. Further, the inner slide rails of the housing are respectively coupled to the outer rails of the transmission seat to enhance moving stability of the transmission seat.

In one embodiment of the present invention, the housing comprises a ridge-shaped protruding portion located on an outer perimeter thereof, and an arched recessed portion disposed adjacent to the ridge-shaped protruding portion. Further, the sector gear comprises an axle pivotally connected to the ridge-shaped protruding portion of the housing. Further, the swing arm has one end thereof fixedly connected to the axle of the sector gear by a connection member. Further, the center of axis of the connection member is kept in a coaxial relationship relative to the center of the arched recessed portion to increase the swing angle of the swing arm, thereby enhancing the operation accuracy.

Other advantages and features of the present invention will be fully understood by reference to the following specification in conjunction with the accompanying drawings, in which like reference signs denote like components of structure.

DETAILED DESCRIPTION OF THE INVENTION

Figure 1:
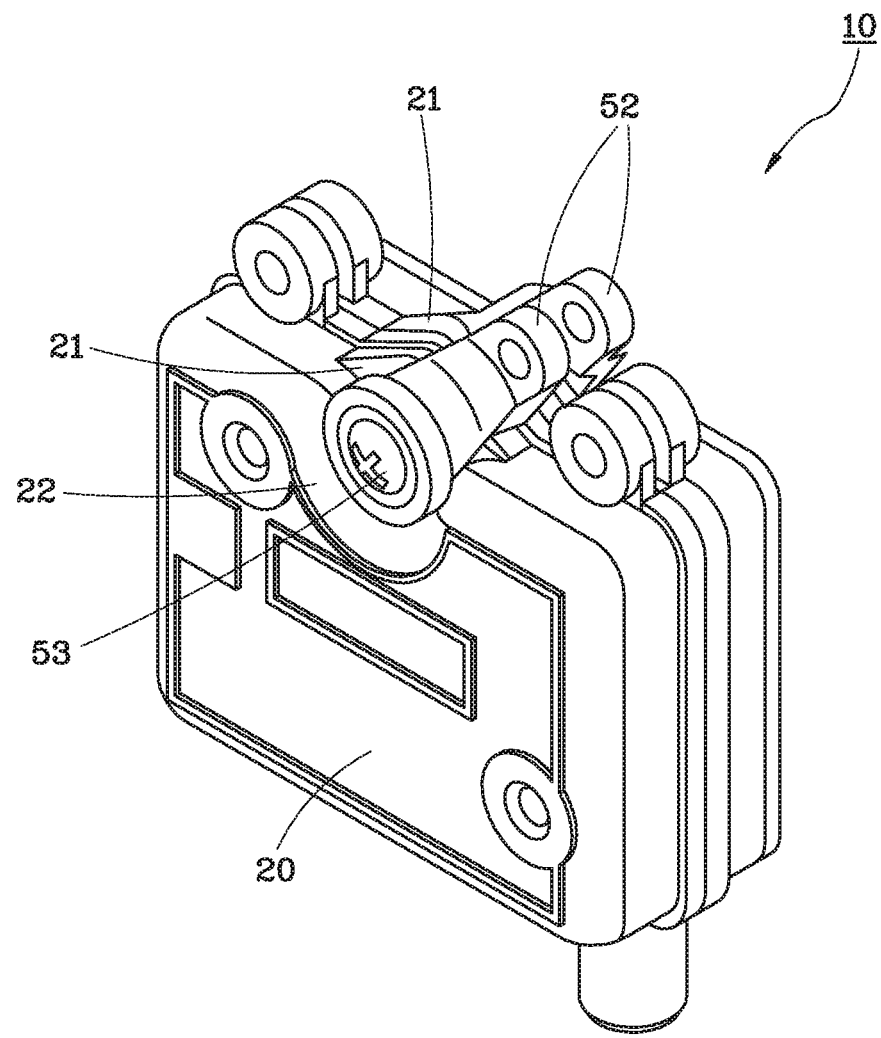
FIG. 1 is an elevational view of a swing type power door lock actuator in accordance with a first embodiment of the present invention.
Figure 2:
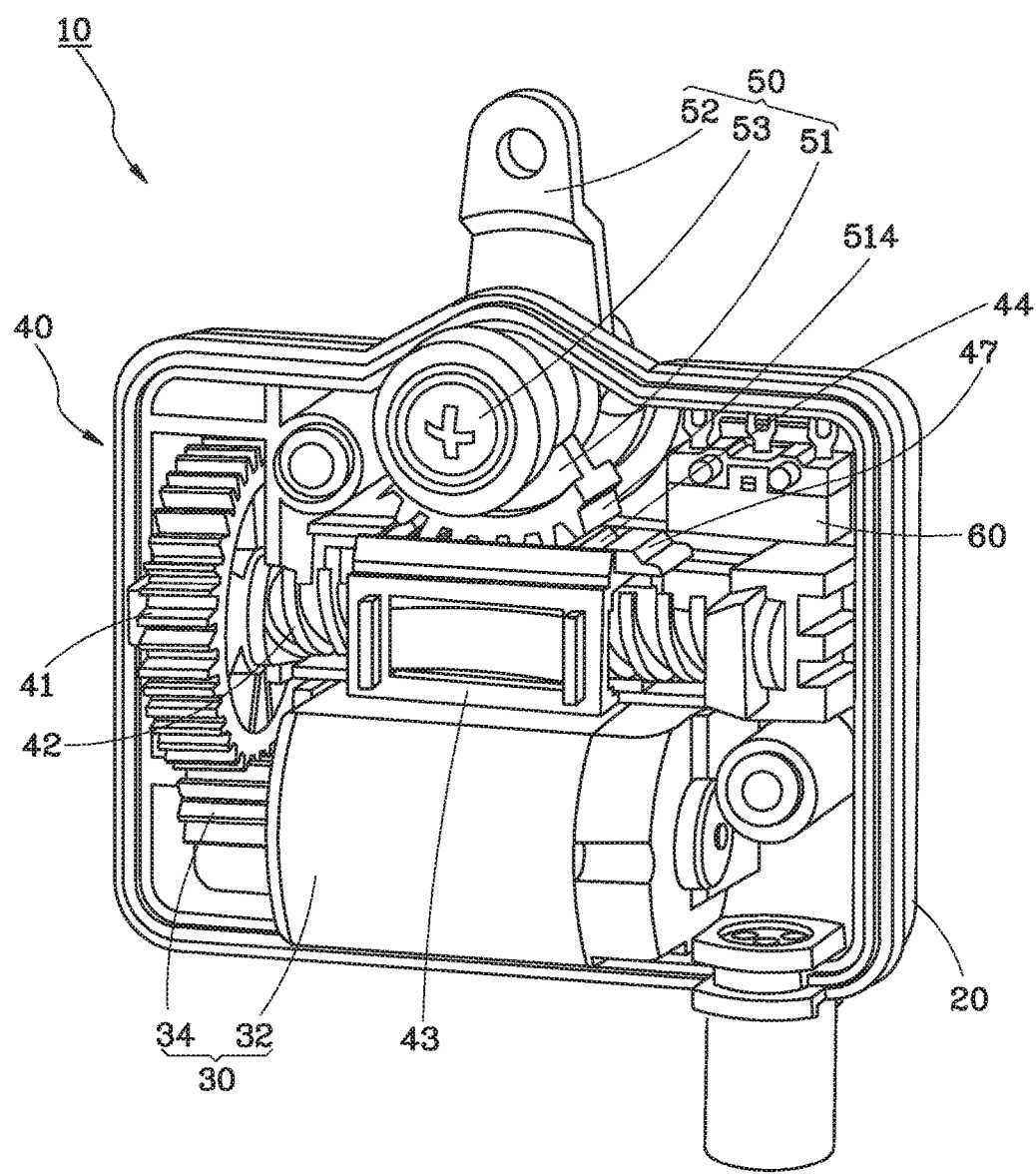
FIG. 2 is a sectional elevation view of the first embodiment of the present invention, illustrating the internal structure of the swing type power door lock actuator.

Referring to FIGS. 1 and 2, a swing type power door lock actuator 10 in accordance with the present invention is shown comprising a housing 20, a drive unit 30, a transmission unit 40, and a swing unit 50.

Figure 3:
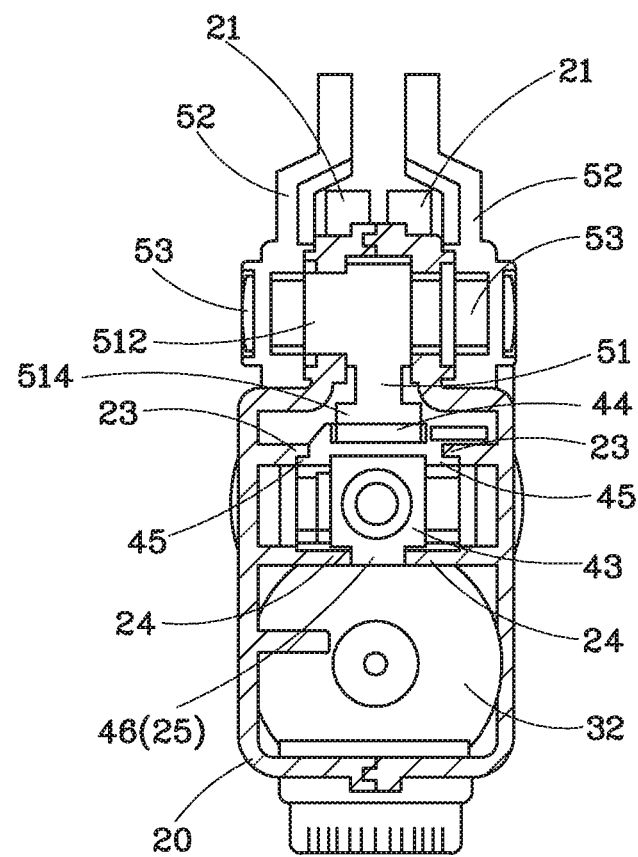
FIG. 3 is a sectional side view of the swing type power door lock actuator in accordance with the first embodiment of the present invention.

The housing 20 comprises two adjacent ridge-shaped protruding portions 21 and two opposite arched recessed portions 22 at the outer perimeter thereof. The two ridge-shaped protruding portions 21 are disposed between the two arched recessed portions 22. Thus, the ridge-shaped protruding portions 21 and the arched recessed portions 22 are adjacently arranged in an inner-outer relationship. Further, as shown in FIG. 3, the housing 20 has two opposing inner slide rails 23 and two opposing extension portions 24 located on an inside wall thereof, wherein the two extension portions 23 define therebetween a guide groove 25 that extends in a parallel manner relative to the inner slide rails 23.

Figure 4:
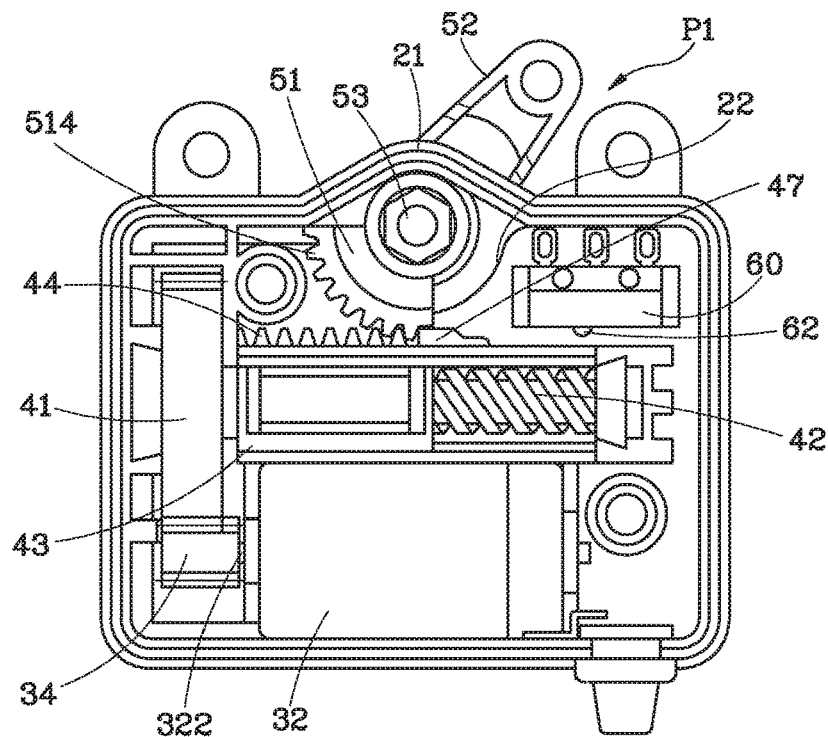
FIG. 4 is a sectional front view of the first embodiment of the present invention, illustrating the swing arm in the unlocking position.

Referring to FIG. 4 and FIG. 2 again, the drive unit 30 is mounted inside the housing 20, comprising a motor 32 and a drive gear 34. The motor 32 comprises a motor shaft 322. The drive gear 34 is fixedly mounted on and rotatable by the motor shaft 322 of the motor 32.

Referring to FIGS. 2 and 4 again, the transmission unit 40 is mounted inside the housing 20, comprising a transmission gear 41, a screw shaft 42 and a transmission seat 43. The transmission gear 41 is meshed with the drive gear 34 of the drive unit 30 so that the transmission gear 41 is rotatable by the drive gear 34. The screw shaft 42 has one end thereof connected to the transmission gear 41 so that the screw shaft 42 is synchronously rotatable with the transmission gear 41. Further, the screw shaft 42 extends axially in a parallel manner relative to the motor shaft 322 of the motor 32. The transmission seat 43 is threaded onto the screw shaft 42 so that the transmission seat 43 is movable along the length of the screw shaft 42 during rotation of the screw shaft 42. Preferably, the transmission seat 43 is designed to have a rectangular configuration, avoiding rotation with the screw shaft 42 during displacement. Further, as shown in FIG. 3, the transmission seat 43 comprises two outer rails 45 respectively located at opposing left and right sides thereof and respectively coupled to the inner slide rails 23 of the housing 20, a guide block 46 located at a bottom side thereof and inserted into the guide groove 25 of the housing 20 to enhance sliding stability during sliding movement of the transmission seat 43, a toothed rack 44 located at a top side thereof, and a trigger push block 47 adjoined to one end of the toothed rack 47. The toothed rack 44 can be formed integral with the transmission seat 43. Alternatively, the toothed rack 44 can be a separated member affixed to the transmission seat 43. Preferably, the toothed rack 44 is an attached member.

Figure 7:
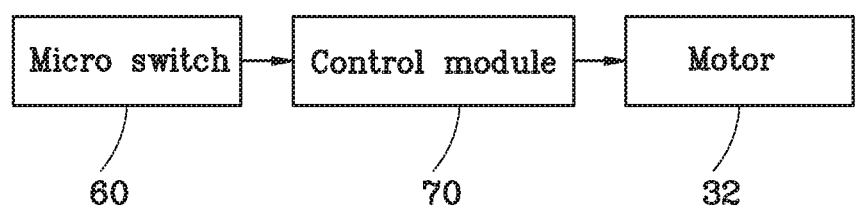
FIG. 7 is a block diagram of the first embodiment of the present invention, illustrating the relationship among the micro switch, the control module and the motor.

For controlling the operation stroke of the motor 32 accurately, a micro switch 60 is mounted in the housing 20, as shown in FIGS. 2 and 4. The micro switch 60 is electrically connected to a control module 70 that is electrically coupled with the motor 32. Further, the micro switch 60 comprises a trigger lever 62. Thus, when the trigger push block 47 of the transmission seat 43 is moved with the transmission seat 43 to push the trigger lever 62 of the micro switch 60, the micro switch 60 will be triggered to output a signal to the control module 70, causing the control module 70 to stop the motor 32, as shown in FIG. 7.

Figure 6:
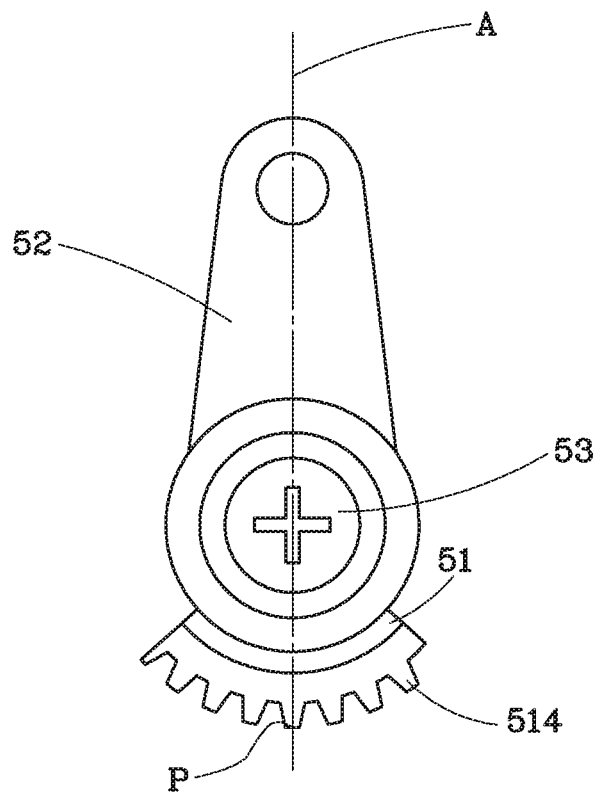
FIG. 6 is a schematic front view of a part of the first embodiment of the present invention, illustrating the relationship between the sector gear and the swing arms.

Referring to FIGS. 1, 2 and 4 again, the swing unit 50 comprises a sector gear 51 and two opposing swing arms 52. The sector gear 51 is pivotally mounted in the housing 20, comprising a tooth-bearing face 514 for engagement with the toothed rack 44 of the transmission unit 40. Further, as shown in FIG. 3, the sector gear 51 comprises an axle 512 pivotally mounted in the ridge-shaped protruding portions 21 of the housing 20 for enabling the sector gear 51 to be rotated by the toothed rack 44. The swing arms 52 are mounted on the outside of the housing 20. One swing arm 52 has its one end fixedly connected to a car door mechanical lock (not shown). The other swing arm 52 has its one end fixedly connected to a car door handle (not shown). The other ends of these two swing arms 52 are respectively fixedly connected to the axle 512 of the sector gear 51 by a respective connection member 53. The center of axis of each connection member 53 is kept in coaxial relationship with the centers of the arched recessed portions 22 of the housing 20, as shown in FIGS. 1 and 4. Further, each swing arm 52 extends along an axis line A in direction away from the sector gear 51. The extending direction of the axis line A passes through the point of bisection P of the tooth-bearing face 514 of the sector gear 51, as shown in FIG. 6. Thus, every swing arm 52 will be biased with the sector gear 51 to move the car door mechanical locks and the car door handles between an unlocking position P1 and a locking position P2, enhancing the safety and convenience of the use of the car.

Figure 5:
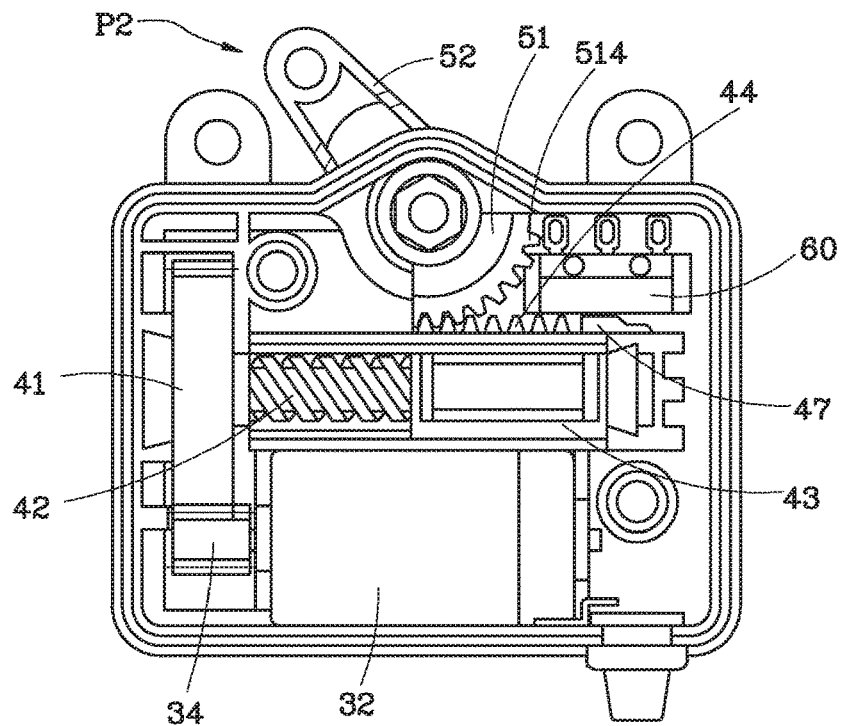
FIG. 5 is similar to FIG. 4, illustrating the swing arm in the locking position.

Referring to FIGS. 4 and 5, when the motor 32 is started with the forward mode, the drive gear 34 will drive the transmission gear 41 to rotate the screw shaft 42 on its own axis in the forward direction. At this time, the transmission seat 43 will be forced to move forward along the length of the screw shaft 42. During the forward movement of the transmission seat 43, the sector gear 51 will be driven by the toothed rack 44 of the transmission seat 43 to bias the swing arms 52 toward the locking position P2. Once the trigger push block 47 of the transmission seat 43 pushes the trigger lever 62 of the micro switch 60, the control module 70 immediately controls the motor 32 to stop rotating subject to the signal provided by the micro switch 60, preventing motor overtravel. At this time, every swing arm 52 will stay in the locking position P2, enabling the car door mechanical locks and the car door handles to complete the locking action all together. On the contrary, when the motor 32 is started with the backward mode, the drive gear 34 will drive the transmission gear 41 to rotate the screw shaft 42 on its own axis in the reversed direction. At this time, the transmission seat 43 will be forced to move backward along the length of the screw shaft 42. During the backward movement of the transmission seat 43, the sector gear 51 will be driven by the toothed rack 44 of the transmission seat 43 to bias the swing arms 52 from the locking position P2 toward the unlocking position P1. When the swing arms 52 reach the unlocking position P1, the motor 32 will automatically stop rotating according to its own stroke setting, enabling the car door mechanical locks and the car door handles to complete the unlocking action all together.

We know from the above description, the swing type power door lock actuator 10 of the present invention utilizes the feature of direct engagement between the drive gear 34 and the transmission gear 41 to rotate the screw shaft 42, and the feature of direct engagement between the toothed rack 44 of the transmission seat 43 and the sector gear 51 to bias the swing arms 52 between the locking position P2 and the unlocking position P1 during rotation of the screw shaft 42. When compared to the prior art patent, the present invention not only simplifies the configuration of the overall structure to enhance the ease of installation, but also enhances the operation smoothness and reduces the failure rate. Further, the pivot points of the swing arms 52 (i.e., the locations of the connection members 53) are disposed outside the housing 20 in a coaxial manner relative to the centers of the arched recessed portions 22 of the housing 20, and, the two connection members 53 are connected between the sector gear 51 and the swing arms 52 in a 180° phase angle relationship. When compared with the prior art patent where the pivot points of the swing arms are disposed inside the housing, the size of the housing 20 of the present invention can be properly reduced, invention to achieve the effect of compact. Further, the swing arms 52 of the present invention can produce a relatively larger swing angle to enhance the operation accuracy. Therefore, the swing type power door lock actuator 10 of the present invention can indeed achieve the objects of simple structure, precision trans of gearing, smooth actuation and small size for easy installation.

Figure 8:
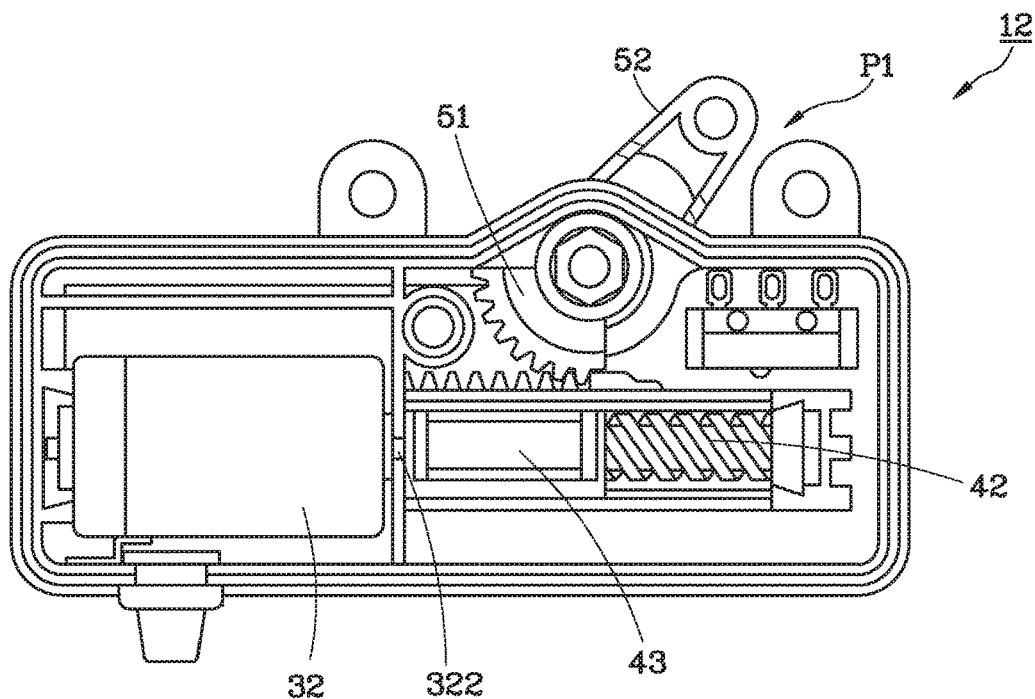
FIG. 8 is a schematic front view of a part of a swing type power door lock actuator in accordance with a second embodiment of the present invention, illustrating a swing arm in an unlocking position.
Figure 9:
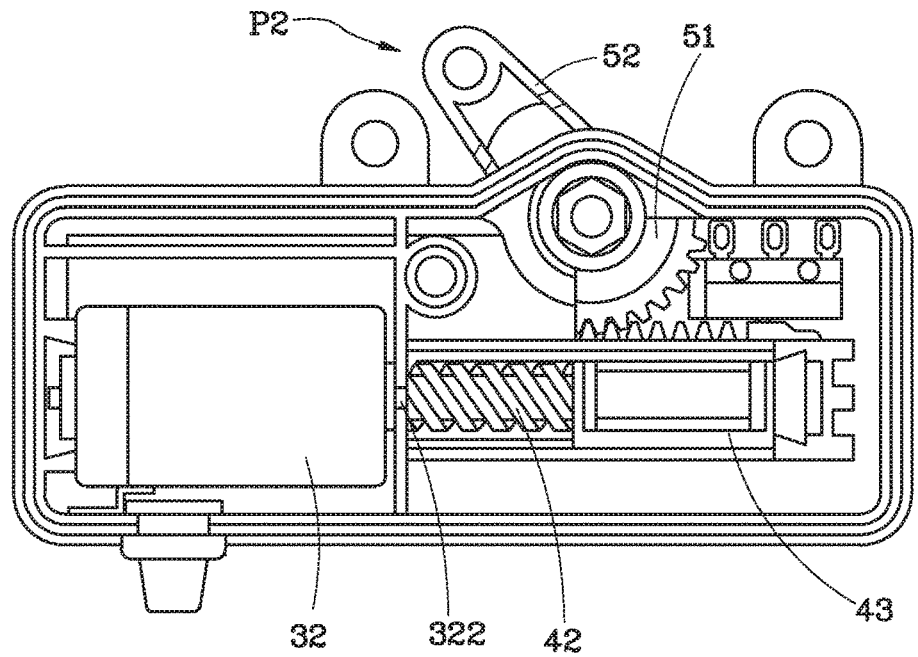
FIG. 9 is similar to FIG. 8, illustrating the swing arm in a locking position.
Figure 10:
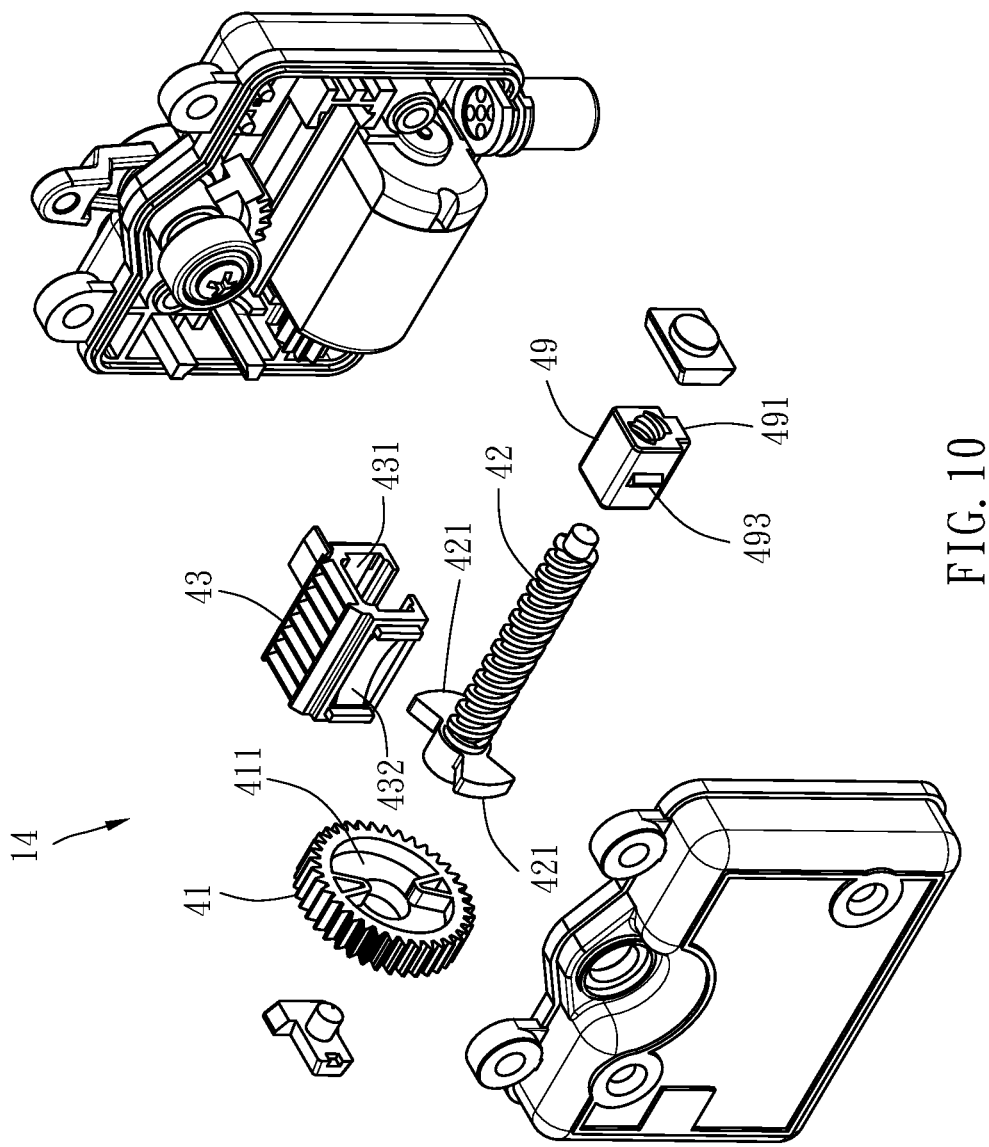
FIG. 10 is an exploded view of a swing type power door lock actuator in accordance with a third embodiment of the present invention.
Figure 11:
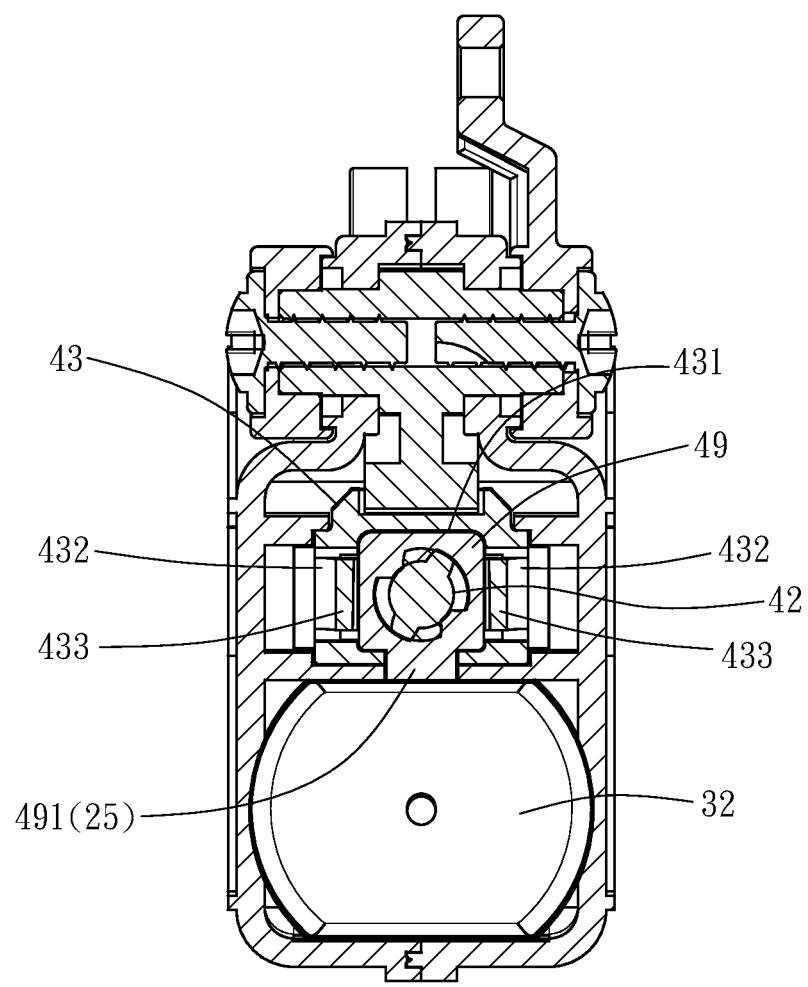
FIG. 11 is a sectional side view of the swing type power door lock actuator in accordance with the third embodiment of the present invention.

Further, the structure of the present invention can be variously embodied. As shown in FIGS. 8 and 9, a swing type power door lock actuator 12 in accordance with a second embodiment of the present invention is shown. This second embodiment is substantially similar to the aforesaid first embodiment with the exception that the drive gear 34 and the transmission gear 41 are eliminated in this second embodiment, and then the motor shaft 322 of the motor 32 is directly connected with the screw shaft 42. Thus, when the motor 32 is started, the screw shaft 42 can be directly rotated by the motor 32, causing the transmission seat 43 to move forward or backward along the length of the screw shaft 42. During forward or backward movement of the transmission seat 43 along the length of the screw shaft 42, the swing arms 52 are biased between the locking position P2 and the unlocking position P1 subject to the relationship of engagement between the transmission seat 43 and the sector gear 51. Thus, the structural configuration of this second embodiment can achieve the same effects of the aforesaid first embodiment.

Referring to FIGS. 10-15, a swing type power door lock actuator 14 in accordance with a third embodiment of the present invention is shown. This third embodiment is substantially similar to the aforesaid first embodiment with the exceptions outlined hereinafter.

The swing type power door lock actuator 14 of this third embodiment further comprises a sliding block 49 threaded onto the screw shaft 42. The sliding block 49 comprises a guide rail 491 located at a bottom side thereof and slidably coupled to the guide groove 25. Thus, the sliding block 49 can be driven by the screw shaft 42 to move along the guide groove 25.

Unlike the aforesaid first embodiment, the transmission seat 43 of this third embodiment eliminates the aforesaid guide block 46. The transmission seat 43 of this third embodiment comprises a passageway 431 for the passing of the sliding block 49. Preferably, the transmission seat 43 of this third embodiment has an inverted U-shape cross section with the passageway 431 defined therein on the middle. The sliding block 49 further comprises two bumps 493 respectively located at two opposite lateral walls thereof. The transmission seat 43 of this third embodiment further comprises two biasing surfaces 432 respectively disposed at two opposite lateral sides thereof. Each biasing surface 432 comprises an actuation block 433 protruding toward the passageway 431. When the sliding block 49 passes through the passageway 431 of the transmission seat 43, the two bumps 493 will be respectively forced against the respective actuation blocks 433, moving transmission seat 43 to a first position (see FIG. 12) or a second position (see FIG. 14). When the two biasing surfaces 432 are squeezed by an external force, they will curve outwards, and will return to their previous position after the external force is disappeared. In this embodiment, the bumps 493 and the actuation blocks 433 have a pyramidal cross section, however, they can be configured to have a semi-cylindrical cross section according to the needs of the manufacturer.

In order to increase the impulse during driving, the transmission gear 41 is configured to provide two fan-shaped grooves 411, and the screw shaft 42 is configured to provide two fan blades 421 that are respectively movably received in the respective fan-shaped grooves 411. Further, the angle of the fan-shaped grooves 411 is greater than the angle of the fan blades 421 (as is clear from FIG. 10). The transmission gear 41 drives the screw shaft 42 to rotate by means of abutting the respective groove walls of the fan-shaped grooves 411 against the respective border edges of the fan blades 421 of the screw shaft 42. Since the angle of the fan blades 421 is smaller than the angle of the fan-shaped grooves 411, the transmission gear 41 will run idle at the initial stage during its rotation, and will then force the respective groove walls of the fan-shaped grooves 411 to abut against the respective border edges of the fan blades 421 of the screw shaft 42 and to further rotate the screw shaft 42, increasing the impulse. The same effect can be produced when the transmission gear 41 is rotated in the reversed direction. This can help to smooth the movement of the mechanism when it is started to drive, eliminating the problem of being not easy to drive.

Referring to FIGS. 12 and 13 again, when the motor 32 is started to rotate the screw shaft 42 in the forward mode, the sliding block 49 is caused to move axially along the screw shaft 42 into the passageway 431 of the transmission seat 43 and to abut the bumps 493 against the respective rear sides of the respective actuation blocks 433 of the transmission seat 43, carrying the transmission seat 43 from the first position toward the second position. As illustrated in FIG.

Figure 12:
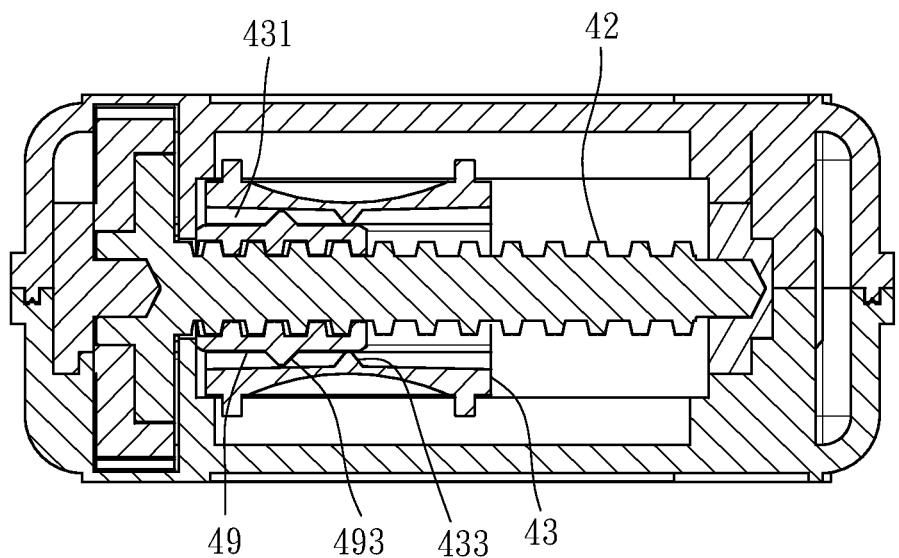
FIG. 12 is a schematic operational view of the swing type power door lock actuator in accordance with the third embodiment of the present invention (I), illustrating the relationship between the sliding block and the transmission seat.
Figure 13:
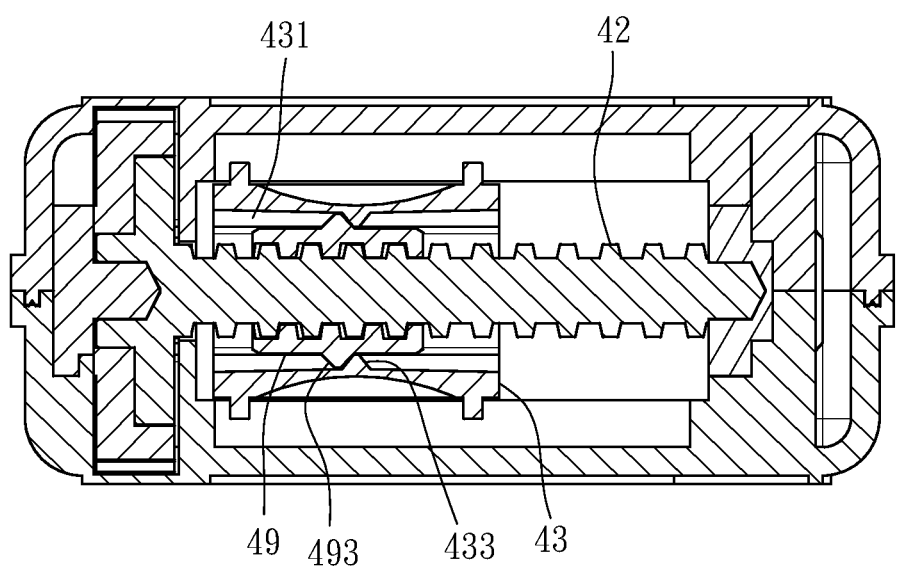
FIG. 13 is a schematic operational view of the swing type power door lock actuator in accordance with the third embodiment of the present invention (II).
Figure 14:
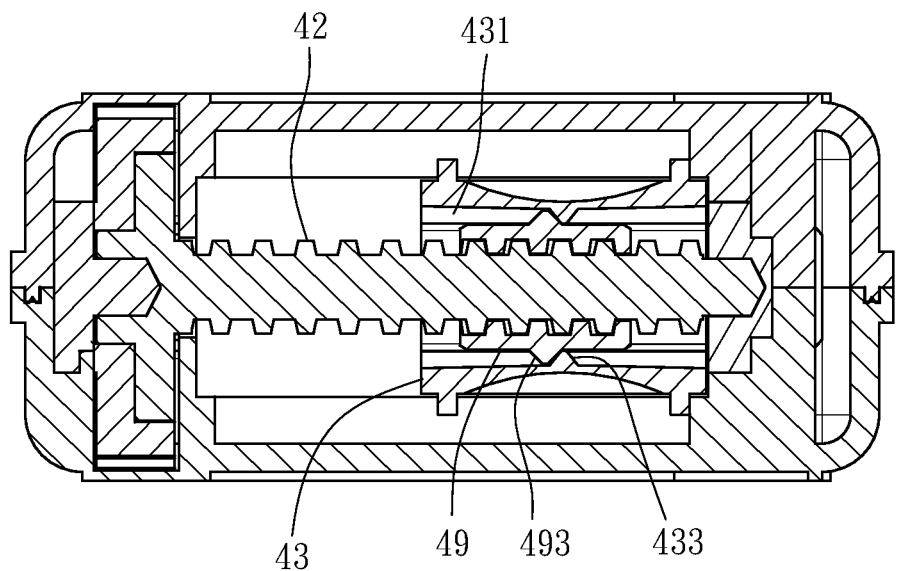
FIG. 14 is a schematic operational view of the swing type power door lock actuator in accordance with the third embodiment of the present invention (III).
Figure 15:
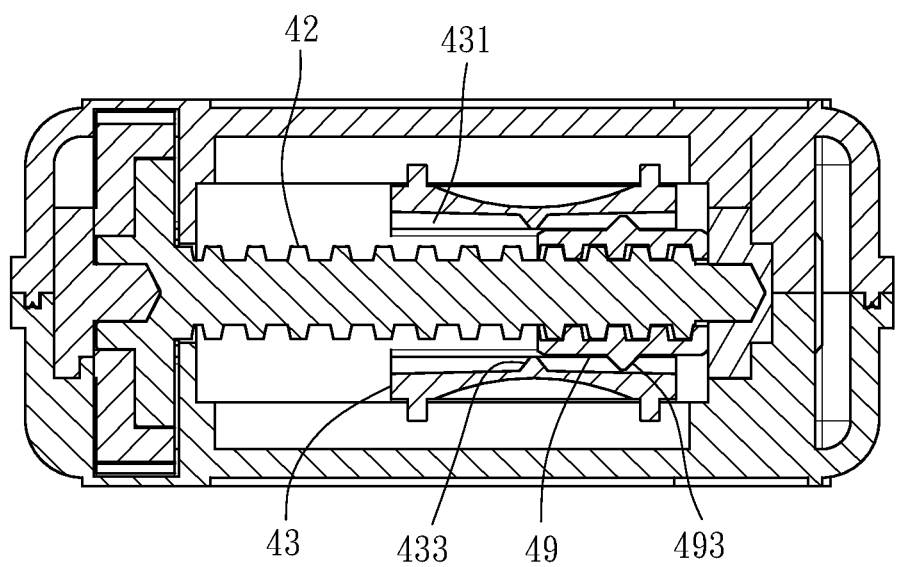
FIG. 15 is a schematic operational view of the swing type power door lock actuator in accordance with the third embodiment of the present invention (IV).

14, when the transmission seat 43 reaches the second position, it is stopped from moving forward, at this time, the sliding block 49 is being continuously driven by the screw shaft 42 to move forward, and thus, the bumps 493 are continuously forced against the actuation blocks 433 of the respective biasing surfaces 432, causing the biasing surfaces 432 to curve outwards and to let the bumps 493 move over the respective actuation blocks 433 to the front side, as illustrated in FIG. 15. After the bumps 493 moved over the respective actuation blocks 433, the biasing surfaces 432 immediately return to their previous shape. When the motor 32 is controlled to rotate the screw shaft 42 in the reverse mode, the sliding block 49 is caused to move axially backwardly along the screw shaft 42 to abut the bumps 493 against the respective front sides of the respective actuation blocks 433 of the transmission seat 43, carrying the transmission seat 43 from the second position toward the first position. When the transmission seat 43 reaches the first position, it is stopped from moving backward, at this time, the sliding block 49 is being continuously driven by the screw shaft 42 to move backward, and thus, the bumps 493 are continuously forced against the actuation blocks 433 of the respective biasing surfaces 432, causing the biasing surfaces 432 to curve outwards and to let the bumps 493 move over the respective actuation blocks 433 to the respective back sides of the respective actuation blocks 433. After the bumps 493 moved over the respective actuation blocks 433, the biasing surfaces 432 immediately return to their previous shape, as illustrated in FIG. 12. If the transmission unit encounters significant resistance during driving of the power door lock actuator or if the power door lock fails or is stuck, the mating design between the bumps 493 and the actuation blocks 433 of the respective biasing surfaces 432 still allows the sliding block 49 to be forced to move through the transmission seat 43 without causing damage.

The other structural details and effects of this third embodiment are same as the aforesaid first embodiment, and repeat description is not necessary.

What is claimed is:

1. A swing power door lock actuator, comprising:
    a housing comprising two opposing inner slide rails, two opposing extension portions extended from an inside wall thereof and defining therebetween a guide groove;
    a drive unit mounted inside said housing, said drive unit comprising a motor and a drive gear fixedly connected to said motor;
    a transmission unit mounted inside said housing, said transmission unit comprising a screw shaft, a sliding block, a transmission seat, and a transmission gear, said screw shaft having one end thereof coupled to said motor, said sliding block being threaded onto said screw shaft, said sliding block comprising a guide rail located at a bottom side thereof and slidably coupled to said guide groove so that said sliding block is drivable by said screw shaft to move along said guide groove, said transmission seat being slidably set between said two inner slide rails and movable along said two inner slide rails between a first position and a second position, said transmission seat comprising a toothed rack located at a top side thereof, the transmission gear meshed with said drive gear and fixedly connected to said screw shaft; and
    a swing unit comprising a sector gear and at least one swing arm, said sector gear being pivotally mounted in said housing, said sector gear comprising a tooth-bearing face meshed with said toothed rack of said transmission unit, said at least one swing arm being disposed outside said housing, each said swing arm having one end thereof connected to said sector gear;
    wherein said sliding block comprises two bumps respectively located at two opposite lateral sides thereof; said transmission seat further comprises a passageway extended through opposing front and rear sides thereof for the passing of said sliding block, a longitudinal bottom groove to allow the guide rail of the sliding block to couple the guide groove on the housing, and two biasing surfaces respectively arranged at two opposite lateral sides of said passageway, each said biasing surface comprising an actuation block protruding into said passageway and stoppable by one respective said bump for enabling said transmission seat to be moved by said sliding block when said sliding block goes through said passageway, said biasing surfaces being deformable to curve outwards when receives a pressure from said bumps over a predetermined value and capable of elastically returning to the previous shape thereof after the pressure from said bumps disappeared.

2. The swing power door lock actuator as claimed in claim 1, wherein said drive gear is fixedly connected to a motor shaft of said motor.

3. The swing power door lock actuator as claimed in claim 2, wherein said transmission gear comprises two fan-shaped grooves; said screw shaft comprises two fixed fan blades respectively movably received in the respective said fan-shaped grooves and drivable by respective groove walls of said fan-shaped grooves of said transmission gear to rotation of said screw shaft upon rotation of said transmission gear, the angle of said fan-shaped grooves being greater than the angle of said fan blades, said transmission gear.

4. The swing power door lock actuator as claimed in claim 1, wherein said housing has a micro switch mounted therein and electrically connected to said motor, said micro switch comprising a trigger lever; said transmission seat comprises a trigger push block disposed adjacent to said toothed rack and adapted for pushing said trigger lever of said micro switch.

5. The swing power door lock actuator as claimed in claim 1, wherein said transmission seat comprises two outer rails respectively located at opposing left and right sides thereof; said housing comprises two inner slide rails respectively coupled with said outer rails.

6. The swing power door lock actuator as claimed in claim 1, wherein said housing further comprises at least one ridge-shaped protruding portion located on an outer perimeter thereof and at least one arched recessed portion disposed adjacent to said at least one ridge-shaped protruding portion; said sector gear comprises an axle pivotally connected to said at least one ridge-shaped protruding portion of said housing; each said swing arm has one end thereof fixedly connected to said axle of said sector gear by a connection member thereof, the center of axis of said connection member being kept in a coaxial relationship relative to the center of each said arched recessed portion.

7. The swing power door lock actuator as claimed in claim 6, wherein said toothed-bearing face of said sector gear defines a point of bisection; each said swing arm extends from said connection member along an axis line in direction away from said sector gear, the extending direction of said axis line passes through said point of bisection of said tooth-bearing faced of said sector gear.

8. The swing power door lock actuator as claimed in claim 6, wherein said housing comprises two said ridge-shaped protruding portions and two said arched recessed portions; said swing unit comprises two said swing arms, said two swing arms each having one end thereof respectively connected to said axle of said sector gear by one respective said connection member.

9. The swing power door lock actuator as claimed in claim 7, wherein said housing comprises two said ridge-shaped protruding portions and two said arched recessed portions; said swing unit comprises two said swing arms, said two swing arms each having one end thereof respectively connected to said axle of said sector gear by one respective said connection member.

10. The swing power door lock actuator as claimed in claim 1, wherein said motor shaft of said motor extends axially in a parallel relationship relative to the extending direction of said screw shaft.

11. The swing power door lock actuator as claimed in claim 1, wherein said bumps and said actuation blocks are selectively configured to exhibit a pyramidal or semi-cylindrical cross section.

* * * * *